United States Patent
Tesar

(10) Patent No.: US 10,464,413 B2
(45) Date of Patent: Nov. 5, 2019

(54) ELECTRIC MULTI-SPEED HUB DRIVE WHEELS

(71) Applicant: Delbert Tesar, Austin, TX (US)

(72) Inventor: Delbert Tesar, Austin, TX (US)

(*) Notice: Subject to any disclaimer, the term of this patent is extended or adjusted under 35 U.S.C. 154(b) by 0 days.

(21) Appl. No.: 15/633,588

(22) Filed: Jun. 26, 2017

(65) Prior Publication Data
US 2017/0368931 A1    Dec. 28, 2017

Related U.S. Application Data

(60) Provisional application No. 62/354,417, filed on Jun. 24, 2016.

(51) Int. Cl.
| | |
|---|---|
| *B60K 17/06* | (2006.01) |
| *B60K 17/04* | (2006.01) |
| *B60K 17/02* | (2006.01) |
| *B60K 7/00* | (2006.01) |

(Continued)

(52) U.S. Cl.
CPC .......... *B60K 17/046* (2013.01); *B60K 7/0007* (2013.01); *B60K 17/02* (2013.01);
(Continued)

(58) Field of Classification Search
CPC .......... F16H 2200/2094; B60B 35/122; B60B 35/18; B60K 17/046; B60K 17/043;
(Continued)

(56) References Cited

U.S. PATENT DOCUMENTS

| | | |
|---|---|---|
| 276,776 A | 5/1883 | Clemons |
| 341,389 A | 5/1886 | Prescott |

(Continued)

FOREIGN PATENT DOCUMENTS

| | | |
|---|---|---|
| EP | 0058025 A1 | 8/1982 |
| EP | 0527483 A2 | 2/1993 |

(Continued)

OTHER PUBLICATIONS

Ghionea, Adrian et al.; "Utilization of Some Computer Assisted Techniques in Generating and Study of the Hypocycloidal Flanks of the Spur Gear Teeth Stress"; 5th International Meeting of the Carpathian Region Specialists In The Field of Gears; May 2004; 8 pages.

(Continued)

*Primary Examiner* — Roger L Pang
(74) *Attorney, Agent, or Firm* — John A. Forkort; Forkort & Houston PC

(57) ABSTRACT

A rotary actuator is provided which includes a prime mover including a rotor and a stator; a front-end star compound gear equipped with a first pinion, a first plurality of star gears arrayed concentrically around said first pinion, a first clutch, a first clutch shift motor, an output shaft, and first, second and third gears, wherein said third gear is attached to said output shaft; a back-end star compound gear; and a wheel interface including a principal bearing and a brake disk. The first pinion drives said the clutch. The first clutch shift motor shifts the first clutch between a first position in which the first clutch engages the first gear, and a second position in which the first clutch engages the second gear. When the first clutch engages the first gear, the first gear drives the first plurality of star gears. When the first clutch engages the first gear, the first plurality of star gears drive the third gear, or the first clutch engages the third gear to drive the output shaft directly.

24 Claims, 13 Drawing Sheets

(51) Int. Cl.
*B60K 17/14* (2006.01)
*B60B 35/12* (2006.01)
*B60B 35/18* (2006.01)

(52) U.S. Cl.
CPC ............ *B60K 17/06* (2013.01); *B60K 17/145* (2013.01); *B60B 35/122* (2013.01); *B60B 35/18* (2013.01); *B60K 17/043* (2013.01); *B60K 2007/0038* (2013.01); *B60K 2007/0092* (2013.01); *F16H 2200/2094* (2013.01)

(58) Field of Classification Search
CPC .... B60K 17/06; B60K 17/145; B60K 7/0007; B60K 2007/0092; B60K 2007/0038
USPC ............................ 74/329, 330; 180/371, 372
See application file for complete search history.

(56) References Cited

U.S. PATENT DOCUMENTS

| | | |
|---|---|---|
| 386,168 A | 7/1888 | Spencer et al. |
| 1,601,750 A | 10/1926 | Wildhaber |
| 2,084,844 A | 6/1937 | Harris |
| 2,750,850 A | 6/1956 | Wildhaber |
| 3,310,990 A | 3/1967 | Lettel |
| 3,371,552 A | 3/1968 | Soper |
| 3,705,522 A | 12/1972 | Ogawa |
| 3,709,055 A | 1/1973 | Grove |
| 3,729,276 A | 4/1973 | Boyadjieff et al. |
| 3,907,470 A | 9/1975 | Harle et al. |
| 4,095,150 A | 6/1978 | Senckel |
| 4,270,401 A | 6/1981 | Davidson |
| 4,367,424 A | 1/1983 | Presley |
| 4,407,170 A | 10/1983 | Fukui |
| 4,505,166 A | 3/1985 | Tesar |
| 4,768,400 A | 9/1988 | McKay |
| 4,846,018 A | 7/1989 | Matsumoto et al. |
| 4,922,781 A | 5/1990 | Peiji |
| 4,988,581 A | 1/1991 | Wycliffe |
| 5,102,377 A | 4/1992 | Spanski |
| 5,116,291 A | 5/1992 | Toyosumi et al. |
| 5,293,107 A | 3/1994 | Akeel |
| 5,355,743 A | 10/1994 | Tesar |
| 5,692,989 A | 12/1997 | Kamlukin |
| 5,704,864 A | 1/1998 | Yanagisawa |
| 6,119,542 A | 9/2000 | Arbrink |
| 6,367,571 B1 | 4/2002 | Schwarz |
| 6,672,966 B2 | 1/2004 | Muju et al. |
| 6,791,215 B2 | 9/2004 | Tesar |
| 6,948,402 B1 | 9/2005 | Amendolea |
| 6,991,580 B2 | 1/2006 | Elser et al. |
| 7,081,062 B2 | 7/2006 | Tesar |
| 7,122,926 B2 | 10/2006 | Tesar |
| 7,201,700 B2 | 4/2007 | Buxton |
| 7,431,676 B2 | 10/2008 | Tesar |
| 7,534,184 B2 | 5/2009 | Tsurumi |
| 7,552,664 B2 | 6/2009 | Bulatowicz |
| 7,553,249 B2 | 6/2009 | Nohara |
| 7,604,599 B2 | 10/2009 | Fujimoto et al. |
| 7,641,579 B2 | 1/2010 | Junkers |
| 7,722,494 B2 | 5/2010 | Tesar |
| 7,766,634 B2 | 8/2010 | Liavas et al. |
| 7,811,193 B2 | 10/2010 | Nakamura |
| 7,935,017 B2 | 5/2011 | Kurita et al. |
| 7,942,779 B2 | 5/2011 | Kobayashi |
| 7,976,420 B2 | 7/2011 | Nakamura |
| 8,022,564 B2 | 9/2011 | Nohara et al. |
| 8,029,400 B2 | 10/2011 | Nakamura |
| 8,033,942 B2 | 10/2011 | Tesar |
| 8,047,943 B2 | 11/2011 | Nakamura |
| 8,117,945 B2 | 2/2012 | Nakamura |
| 8,133,143 B2 * | 3/2012 | Schoon ................ H02K 7/1025 180/371 |
| 8,162,789 B2 | 4/2012 | Takeuchi |
| 8,235,856 B2 | 8/2012 | Nakamura |
| 8,308,599 B2 | 11/2012 | Akami |
| 8,323,140 B2 | 12/2012 | Nakamura |
| 8,353,798 B2 | 1/2013 | Miyoshi et al. |
| 8,382,629 B2 | 2/2013 | Hirata |
| 8,424,625 B2 * | 4/2013 | Ishii .................... B60K 6/26 180/65.31 |
| 8,435,149 B2 | 5/2013 | Koyama et al. |
| 8,523,732 B2 | 9/2013 | Le Moal |
| 8,545,357 B2 | 10/2013 | Hibino |
| 9,067,582 B2 * | 6/2015 | Smetana ............... B60K 6/365 |
| 9,365,105 B2 | 6/2016 | Tesar |
| 9,566,857 B1 * | 2/2017 | Pritchard ................. B60K 6/50 |
| 9,579,974 B2 * | 2/2017 | Bittlingmaier ....... B60K 17/043 |
| 9,657,813 B2 | 5/2017 | Tesar |
| 9,879,760 B2 | 1/2018 | Teasr |
| 9,915,319 B2 | 3/2018 | Tesar |
| 2003/0027681 A1 | 2/2003 | Kakemo |
| 2004/0007923 A1 | 1/2004 | Tesar |
| 2004/0102274 A1 | 5/2004 | Tesar |
| 2004/0103742 A1 | 6/2004 | Tesar |
| 2005/0168084 A1 | 8/2005 | Tesar |
| 2005/0221945 A1 | 10/2005 | Plath |
| 2006/0264292 A1 | 11/2006 | Plath |
| 2007/0168081 A1 | 7/2007 | Shin et al. |
| 2007/0249457 A1 | 10/2007 | Tesar |
| 2008/0060473 A1 | 3/2008 | Li |
| 2008/0139357 A1 | 6/2008 | Fujimoto |
| 2008/0257088 A1 | 10/2008 | Tesar |
| 2008/0269922 A1 | 10/2008 | Tesar |
| 2008/0295623 A1 | 12/2008 | Kurita et al. |
| 2009/0075771 A1 | 3/2009 | Tesar |
| 2009/0118050 A1 | 5/2009 | Takeuchi |
| 2010/0113206 A1 | 5/2010 | Wang et al. |
| 2012/0088622 A1 | 4/2012 | Tesar |
| 2012/0204671 A1 | 8/2012 | Tesar |
| 2012/0215450 A1 | 8/2012 | Ashok et al. |
| 2013/0217530 A1 | 8/2013 | Tesar |
| 2014/0224064 A1 | 8/2014 | Tesar |
| 2014/0228162 A1 | 8/2014 | Tesar |
| 2014/0246893 A1 | 9/2014 | Tesar |
| 2015/0102655 A1 * | 4/2015 | Tesar ..................... F16D 13/26 301/6.5 |
| 2015/0292601 A1 * | 10/2015 | Tesar ..................... F16D 13/26 475/149 |

FOREIGN PATENT DOCUMENTS

| | | |
|---|---|---|
| EP | 2149724 A1 | 2/2010 |
| EP | 2169263 B1 | 3/2010 |
| GB | 008203 | 4/1903 |
| GB | 224449 | 11/1924 |
| GB | 419171 | 11/1934 |
| GB | 426136 | 3/1935 |
| GB | 450246 | 7/1936 |
| GB | 676894 | 8/1952 |
| GB | 759185 | 10/1956 |
| GB | 775629 | 5/1957 |
| GB | 856486 | 12/1960 |
| GB | 926760 | 5/1963 |
| GB | 1083689 | 9/1967 |
| GB | 1104250 | 2/1968 |
| GB | 1176936 | 1/1970 |
| GB | 1179105 | 1/1970 |
| GB | 1409651 | 10/1975 |
| GB | 1453135 | 10/1976 |
| GB | 1453135 A | 10/1976 |
| GB | 1494895 | 12/1977 |
| GB | 2014260 A | 8/1979 |
| GB | 2377740 A | 1/2003 |
| GB | 2387882 A | 10/2003 |
| GB | 2489503 A | 10/2012 |
| WO | 96/04493 A1 | 2/1996 |

OTHER PUBLICATIONS

Jones, Chris M. Sr.; "'Real-Time' Travel: A Strategy for Distributed Synchronized Actuator Control Using Open Standards"; Naval Engineers White Paper; 9 pages.

(56) References Cited

OTHER PUBLICATIONS

Rabindran, Dinesh et al.; "A Differential-Based Dual Actuator for a Safe Robot Joint: Theory and Experiments"; Norld Automated Congress (WAC); Aug. 2014; 6 pages.

Tesar, Delbert et al.; "Test-Bed to Measure the Performance Criteria of Actuators"; Robotics Research Group, University of Texas at Austin, 2002 Deliverable for Thread 3: High Performance Envelope Based on Intelligent; Dec. 1, 2001; 14 pages.

Townsend, Dennis P.; "A Comparison of the Double-Circular-Arc-Gear Drives With Standard Involute Gear Drives"; Abstract; www.pumpjack.com/downloads; 8 pages.

Litvin, Faydor L et al.; "Helical Gears With Circular Arc Teeth: Generation, Geometry, Precision and Adjustment to Errors, Computer Aided Simulation of Conditions of Meshing, and Bearing Contact"; NASA Contractor Report 4089; AVSCOM Technical Report 87-C-18; Oct. 1987; 95 pages.

Krisfinamoorthy, Ganesh et al.; "Multi-Sensor Architecture for Intelligent Electromechanical Actuators"; 12th IFToMM World Congress, Besancon, France; Jun. 18-21, 2007; 6 pages.

Lim, Gee Kwang et al.; "Modeling and Simulation of a Stewart Platform Type Parallel Structure Robot"; Final Report, Grant No. NAG 9-188; the University of Texas at Austin, Mechanical Engineering Department; Apr. 1989; 216 pages.

Lee, Hoon et al.; "An Analytical Stiffness Analysis Between Actuator Structure and Principal Bearings Used for Robot Actuators"; Proceedings of ASME 2011 International Design Engineering Technical Conference and Computers and Information in Engineering Conference; IDEC/CIE 2011; Aug. 29-31, 2011; Washington, D.C.; 10 pages.

Koran, Lucas et al.; "Duty Cycle Analysis to Drive Intelligent Actuator Development"; IEEE Systems Journal; May 2008; 14 pages.

Ashok, Pradeepkumar et al.; "Guidelines for Managing Sensors in Cyber Physical Systems with Multiple Sensors"; Research Article; Hindawi Publishing Corporation, Journal of Sensors; vol. 2011, Article ID 321709; Nov. 22, 2011;16 pages.

Hvass, Paul Brian et al.; "Condition Based Maintenance for Intelligent Electromechanical Actuators"; Research Paper; Jun. 2004; 262 pages.

Kang, Seong-Flo et al.; "Indoor GPS Metrology System with 3D Probe for Precision Applications"; ASPE.pointinspace.com/publications/annual_2004 Papers; 2004; 4 pages.

Knight, W.; "The Robots Running This Way"; MIT Technology Review; 2014; 8 pages.

Ting, Yung et al.; "A Control Structure for Fault-Tolerant Operation of Robotic Manipulators"; Research Paper; University of Texas at Austin, Department of Mechanical Engineering; Apr. 1993; 10 pages.

\* cited by examiner

Benefits Based On Open Architecture Vehicles (1)
(Using Electric Multi-Speed Hub Drive Wheels – eMDW)

1. ECONOMIC IMPACT
   - $1 Trillion/year
     - Land Transport
     - Cars, Trucks, Buses, etc.

2. CUSTOMER CHOICE
   - Expanded Choices
     - Low Cost
     - Standardized Components 3. REDUCED COMPLEXITY
   - Simplify Driveline
     - Electric Wheel Drive
     - Modularity Throughout 4. RAPID VEHICLE REDESIGN
   - Separate Body/Chassis
     - Configuration Freedom
     - Use Emerging Technologies 5. COMPUTER AS MODEL REFERENCE
   - Move to New Paradigms
     - Customer Accessibility
     - Plug/Play Supply Chain 6. TRACTION MANAGEMENT
   - Tire/Surface Friction
     - Tire Performance Maps
     - Impact of Poor Weather 7. eMDW PERFORMANCE MAPS
   - Manage Nonlinearities
     - Stay In Performance Sweet Spot
     - Efficiency, Acceleration, Temp.
     - Minimization of Fuel Use 8. eMDW CONFIGURATIONS
   - Two/Four Speeds
     - HEV Cars, Buses, Fleet Vehicles
     - Cross-Country Trucks

*FIG. 3*

Benefits Based On Open Architecture Vehicles (2)
(Using Electric Multi-Speed Hub Drive Wheels – eMDW)

9. RECONFIGURABLE POWER CONT.
   - Match eMDW Demands
     - Switchable Circuits
     - Multiple Voltage Levels 10. REMAINING USEFUL LIFE (RUL)
    - Predict Failures
      - Off-Line Analysis
      - No Unexpected Failures 11. HYBRID ELECTRIC VEHICLES
    - Efficient Power Generation
      - Light Diesel
      - Battery/Power Generator 12. SINGLE POINT FAILURES
    - Increasing Complexity
      - Maximize Config. Choices
      - Eliminate Failure Potential 13. MANEUVERABILITY
    - Response To Steering Commands
      - Manage All Wheel Torques
      - Proportional To Contact Forces
      - Results In Torque Vectoring 14. RESPONSIVENESS
    - Real Time in 5-10 m-sec.
      - Low eMDW Internal Inertia
      - High Output Stiffness
      - No Backlash/Low Lost Motion 15. MANAGED DUTY CYCLES
    - Route Optimization
      - Archive Route Data
      - Start-Stop Accelerations
      - Minimization of Fuel Use
    - Design/Decision Criteria
      - Refine Future Operations

*FIG. 4*

HUMAN CHOICE
(The Customer Is In Charge)

1. RESPOND TO CUSTOMER
   - Drivability
     - Acceleration
     - Emergency Maneuvers
     - Braking
   - Efficiency
     - Urban Operations
     - Highway Oper.
     - Smoothness 2. VEHICLE COST
   - Standardized Components
     - Tuned Engine/Generator
     - Batteries/Inverters/Ultracaps
     - Low Cost MDW's
   - Minimum Set of Components
     - Assemble Car On Demand
     - Responsive Supply Chain
     - Highly Certified/Proven 3. OEM LIFE CYCLE SUPPLY
   - At Time of Purchase
     - Drivability/Efficiency
     - Demand Cycles
     - Future Upgrades
   - Repairs/Upgrades
     - OEM Priorities/Sales
     - OEM Controls Supply Chain
     - Continuous Tech Modernization 4. DURABILITY Vs. COST
   - Customer Wants Durability
     - High-End MDW Modules
     - Careful Software Management
     - CBM/Remaining Useful Life
   - Customer Wants Low Cost
     - Low-End MDW Modules
     - Rapid Module Changeovers
     - 5000 Hour Life for MDW

*FIG. 5*

MDW Purchase and Operational Criteria
(Using MDWs at 16, 20, 24, 32, 40 Hp. Levels)

1. PURCHASE CRITERIA
   - Cost
   - Weight
   - Power
   - Efficiency
   - Durability 2. OPERATIONAL CRITERIA
   - Acceleration
   - Gradeability
   - Braking
   - Handling
   - Ride Comfort 3. REQUIRED DEVELOPMENT
   - Open Architecture
     – Modularity
     – Assemble on Demand
     – Plug-and-Play
     – Standardized Interfaces
     – Minimum Set of Components
     – Mass Production
     – Responsive Supply Chain
   - Multi-speed Hub Drive Wheel
     – 4 Reduction Ratios
     – 4 to 16 Operational Choices
     – 5 to 8 Sizes
     – Maximum Simplicity
     – In-depth Certification

*FIG. 6*

Revolutionary Driveline for Hybrid Automobiles
(Maximize Performance/No Single Point Failures/Reduce Cost 2x)

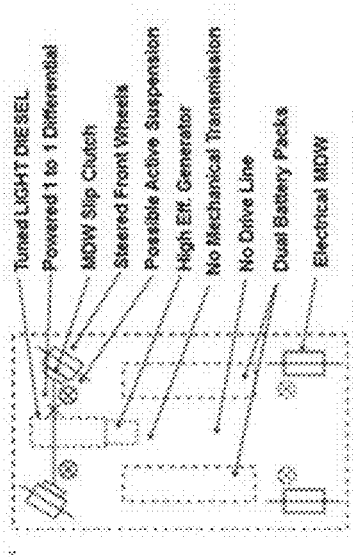

- Tuned LIGHT DIESEL
- Powered 1 to 1 Differential
- MDW Slip Clutch
- Steered Front Wheels
- Possible Active Suspension
- High Eff. Generator
- No Mechanical Transmission
- No Drive Line
- Dual Battery Packs
- Electrical MDW

FOUR MULTI-SPEED HUB DRIVES

II. HYBRID TECH IN BALANCE
- Use Multi-speed Hub Drive
  - Mechanically Drive Rotor
  - Electrically Drive Rotor
  - Separately or in Parallel
- Standardize Hub Drives
  - Five Sizes
    (16, 20, 24, 30, 40 H.P.)
  - Two to Four Speed Ratios
  - Minimize Weight/Cost

III. MAXIMIZE CUSTOMER CHOICES
- Maneuverability/Safety
  - All Road Conditions
  - Drivability/Acceleration
  - No Single Point Failures
- Maximize Efficiency
  - Tuned Engine/Generator
  - Balance Traction Margins
  - Parallel Mech/Elec. Drives
  - Mech/Elec. Torque Summed

IV. CUSTOMIZE FOR CUSTOMER
- On Demand MDW Choice
  - 2- Speed for Cars
  - 4- Speed for Pickups
  - Low Hp. for Efficiency
  - High Hp for Drivability
- Enable Real Time Choices
  - Hwy Cruise/All Mechanical
  - City Drive/All Electrical
  - Lowers Fuel Use & Emissions

*FIG. 7*

High Efficiency Driveline for Cross-Country Trucks
(All Wheels Independently Driven Mechanically)

All Mechanical Driveline

II. Existing Tractor Driveline
- High RPM Diesel (≈1600)
  - Low Efficiency (≈35%)
  - High Sliding Vel. (Gears/Bearings)
  - Multiple Single Point Failures
- Sixteen Speed Driveline
  - One Speed Choice
  - Slow Clutch Changes
  - Dynamic Windup
  - High Inertia/Flywheel III. Revolutionary Driveline
- Low RPM Diesel (≈700)
  - Increase Efficiency ≈15%
  - Tune at One Speed
  - Pulse Compensator 4-bar
  - Reduce Driveline Inertia
- Independent Wheel Drives
  - All Mechanical
  - Two Speed Differentials
  - Wheel Slip Clutches
  - Four Wheel Speeds IV. Distributed Transmission
- Max. Engine Effectiveness
  - Enables Engine Constant Speed
  - Stays in Sweet Spot
  - Pulse Compensator Matches Speed
- Max. Operating Choices
  - 15 Choices Per Wheel
  - Two Differentials Give 4 More
  - Slip Clutch Manages Traction
  - Hundreds of Configurations

*FIG. 8*

Configuration Management for The Modular MDW
(Module Standardization Enhances Performance/Cost)

1. REDUCER MODULE BENEFITS
   - Lowers Weight 10x
   - Lowers Inertia 40x
   - Improves Drawbar Pull
   - Provides 2 to 4 Speeds
   - 12 to1 Up to 200 to 1

2. THREE BASIC MODULES
   - Two-speed Star- Inverted
     – Front End
   - Two-speed Star- Direct
     – Back End
   - Single Plane Star
     – Final Reducer 3. MODULE UTILIZATION
   - Widest Spectrum of Vehicles
     – Cars, Trucks, Loaders, Etc.
     – Maximum Efficiency
     – Match Expected Duty Cycle
     – Front Ends Smaller/High RPM
     – Reduces Weight/Volume 4. TWO-SPEED MDW FOR CARS
   - Use Two Modules (5.33 Final Star)
     – Star-Inverted (2 to 1, 6to 1)
     – 16,000 RPM Motor,1000 RPM Wheel
     – Shift at 250 Wheel RPM (25%)

5. FOUR-SPEED MDW FOR TRUCKS
   - Use All Three Modules
     – Star Inverted (1 to 1, 2 to 1)
     – Star Direct (2 to 1, 4 to 1)
     – Single Plane Star (5.33 to 1)
   - Four Reductions
     – 16, 32, 64, 128 to 1 (Ratios)
     – 1000,500,250,125 RPM (W Speeds)
     – 75,37.5,18.75,9.375 MPH(V Speeds)

6. FOUR-SPEED HEAVY VEHICLES
   - Max Motor Speed of 7000 RPM
   - Max Wheel Speed of 700 RPM 7. FOUR-SPEED HEAVY MACHINERY
   - 2 Star 2 Speed Star / Single Plane
   - 4000 RPM Motor, 400 RPM Wheel
   - Two Dog Leg Clutches

*FIG. 9*

PROPOSED MULTI-SPEED DEVELOPMENT
(Four Speeds – Two Mechanical and Two Electrical)

I. HIGH GEAR RATIO
- 60 to 1 (Two Stage)
  - High Output Torque
- Motor Speed of 5-15,000rpm
  — 5 to 7X Less Inertia
- Speed Below 18mph
  — Acceleration
  — Torque Density
  — Ruggedness
  — Short Duration Peak
  — Response

II. LOW GEAR RATIO
- 15 to 1 (Star Compound)
  — High Output Velocity
- Motor Speed of 5-15,000rpm
- Speed Between 18 to 72mph
  — Efficiency
  — Durability
  — Power Density
  — Temperature Management

III. COMPLEX DUTY CYCLES
- From 2 to 72 mph

2-6mph – Hill Climbing
60 to 1 Ratio
Used Infrequently
5,000rpm Motor

6-18mph – Start Up
Acceleration
High Torque
60 to 1 Ratio
15,000rpm Motor

18-36mph – Continue Acceleration
High Torque
15 to 1 Ratio
7,500rpm Motor

36-72mph – Med/High Road Speed
15 to 1 Ratio
15,000rpm Motor
Maximize Efficiency

*FIG. 10*

MDW – BASIC PROPERTIES
(Expands Human/Operator Choices)

1. EIGHT BASIC CONFIGURATIONS
   - Four Mechanical Speeds
     - 12 to 1 and 48 to 1
   - Four Electrical Regimes
     - Drivability
     - Efficiency 2. EXCEPTIONAL RUGGEDNESS
   - One Principal Bearing
     - High Stiffness
   - Other Bearings
     - Low Diameter
     - Low Friction
     - Held In Rigid Structure
   - Separate Motor Module
     - Shock Isolated
     - Compact Cylindrical Shape
     - Ribbed for Air Cooling 3. POTENTIAL FOR LOW COST
   - All Components Are Standard
     - Small Bearings
     - Helical Gear Teeth
     - 5,000-Hour Durability
   - Standardized Shell/Assembly
     - Shell Is Hub Structure
     - Direct Suspension Attachment
     - Brake Attached To Output Plate
     - Wheel Attached To Output Plate
     - Emergency Brake On Motor
   - BLDC – Lowest Possible Cost
     - No Magnets
     - Simple Wiring In Stator
     - Rotor Uses Simple Laminates
     - Highly Flexible Control
     - Continuous Software Upgrades Feasible

*FIG. 11*

RUGGEDNESS – NOT AN AFTER THOUGHT
(Durability/Shock Resistance First Priority)

1. SIMPLEST POSSIBLE GEAR TRAIN
   - Star Compound
     - No Moving Cage
     - Low Inertia
     - Bearings in Fixed Frame
   - One Principal Bearing
     - Cross Roller Bearing
     - 6x Times Stiffer
     - Low Weight/Volume
     - Bearing For Wheel 2. FULL DESIGN PROCESS
   - Controls All Parameters
     - Visual Design Maps
     - Refined Specification Mgmt.
   - Fully Interactive
     - Designs In Minutes
     - Permits Continuous Review 3. GEAR TRAIN RUGGEDNESS
   - Short Force Path
     - Reduce Effects of Tolerances, Deformations, Temperature
     - Provides Exceptional Stiffness
     - Reduces Weight/Volume 4. CLUTCH DESIGN
   - All Gears Always In Mesh
     - No Synchronization Required
   - Pure Mechanical
     - Dog Leg Simplicity
     - Speed Synch. Necessary
     - 5-10 m-sec. Switch
   - Some Complex Assembly
     - Small Components
     - Low Duty Cycle

*FIG. 12*

Decision Complexity In Electro-Mechanical System
(Real Time: Example of Parallel EMS – 4 MDW* Vehicle)

1. MAXIMIZE CHOICES
   - System Level
     - Hundreds of Criteria
     - Safety, Efficiency
     - Traction, Drivability
   - Component Level
     - Power Utilization
     - 4 Independent MDWs
     - No Single Point Failures 2. POWER UTILIZATION RESOURCES
   - Power to the Road
     - Power Levels $P_f$, $P_r$
     - Two Gear Ratios
     - Two Voltage Levels
   - 8,192 Binary Choices
     - Power $P_f$, $P_r$, on/off   – 32
     - Gear Ratios, H/L              – 16
     - Voltage Levels, H/L           – 16

3. EXPANSION OF BINARY CHOICES
   - Number of Wheels – 4, 6, . . . 14
     - Four Gear Ratios
     - Four Voltage Levels, Etc.
   - Off-Road Operation
     - Construction/Military
     - Wheel/Terrain Interface 4. SOLUTION IN 10 to 100 m-sec.
   - Operator Prioritized Criteria
     - Real Time Sensor Data
     - Conflict Resolution
     - Fault Management
   - Parallel Decision Process
     - Independent Subsystems
     - Algebraic Operations 5. COMPLEXITY DEMANDS OVERSIGHT
   - Full Autonomy Not Likely
     - Operator/System Perf. Maps
     - Operator Visualization \* MDW – Multi-speed Electric Hub Drive Wheel

*FIG. 13*

ELECTRIC MULTI-SPEED HUB DRIVE WHEELS

CROSS-REFERENCE TO RELATED APPLICATION

This application claims the benefit of priority of U.S. provisional application No. 62/354,417, filed Jun. 24, 2016, having the same inventor and the same title, and which is incorporated herein by reference in its entirety.

FIELD OF THE DISCLOSURE

The present disclosure relates generally to electromechanical actuators, and more particularly to electric multi-speed hub drive wheels (eMDWs).

BACKGROUND OF THE DISCLOSURE

Various multi-speed hub drive wheels have been developed in the art. These include, for example, the multi-speed hub drive wheels described in U.S. 2014/0246893 (Tesar), U.S. 2015/0102655 (Tesar) and U.S. 2015/0292601 (Tesar).

BRIEF DESCRIPTION OF THE DRAWINGS

FIGS. 3-4 are depictions of the benefits of open-architecture vehicles which may be based on the eMDWs disclosed herein.

FIG. 5 is a depiction of human choice considerations which may eb provided by the eMDWs disclosed herein.

FIG. 6 is a depiction of purchase and operational criteria which may be associated with the eMDWs disclosed herein.

FIG. 7 is a depiction of a driveline for hybrid automobiles which includes the eMDWs disclosed herein.

FIG. 8 is a depiction of a high efficiency driveline for cross-country trucks which includes the eMDWs disclosed herein.

FIG. 9 is a depiction of a configuration management for modular eMDWs in accordance with the teachings herein.

FIG. 10 is a depiction of a proposed multi-speed development based on the eMDWs disclosed herein.

FIG. 11 is a depiction of some basic properties for a preferred embodiment of the eMDWs disclosed herein.

FIG. 12 is a depiction of features imparting ruggedness to a preferred embodiment of the eMDWs disclosed herein.

FIG. 13 is a depiction of the decision complexity in eMDWs disclosed herein.

SUMMARY OF THE DISCLOSURE

In one aspect, a rotary actuator is provided which comprises (a) a prime mover including a rotor and a stator; (b) a front-end star compound gear equipped with a first pinion, a first plurality of star gears arrayed concentrically around said first pinion, a first clutch, a first clutch shift motor, an output shaft, and first, second and third gears, wherein said third gear is attached to said output shaft; (c) a back-end star compound gear; and (d) a wheel interface including a principal bearing and a brake disk; wherein said first pinion drives said first clutch; wherein said first clutch shift motor shifts said first clutch between a first position in which said first clutch engages said first gear, and a second position in which said first clutch engages said second gear; and wherein, when said first clutch engages said first gear, said first gear drives said first plurality of star gears.

DETAILED DESCRIPTION

It is a goal of the present disclosure to provide an in-wheel drive which maximizes operational choices for the best response to route duty cycles. Such duty cycles are often complex and may include stop-and-go traffic, hilly terrain, poor weather, concern for emissions, a need to maximize efficiency, or a need to minimize route times. All of these priorities may be embedded as real-time operator choices, parametrically defined by criteria measures, and archived to off-line use of predictive analytics to refine these choices, to further improve route planning, to predict timely repair and refreshment, or to recommend improvements to basic component software and hardware.

In many vehicular applications, providing four or more distinct speeds in the drive wheel may maximize the foregoing choices. For example, using four (or more) in-wheel drives on an urban bus, a school bus, or a fleet vehicle may enable a further expansion of these choices. Thus, to start from stop to climb a hill may require the low gear in all 4 wheels. To regenerate energy while going downhill may require all 4 wheels operating initially in high gear and sequentially shifting to low gear while minimizing the use of friction generating brakes. On level terrain, only two (and, in some cases only one) of the wheels may be used for propulsion. In sharp curves, torque levels may be managed to maximize torque in the outer front wheel and to minimize torque at the inner rear wheel. In poor weather conditions, some wheels may experience low traction coefficients (of friction), and hence, less torque may need to be applied to those wheels.

The range of the foregoing choices may be further expanded into a large listing of choices. For 4 speeds in 4 eMDWs, over 2000 distinct choices may be available to the driver. These choices go down dramatically (perhaps to about 250) when using only two eMDWs on the same vehicle.

Figure 1:
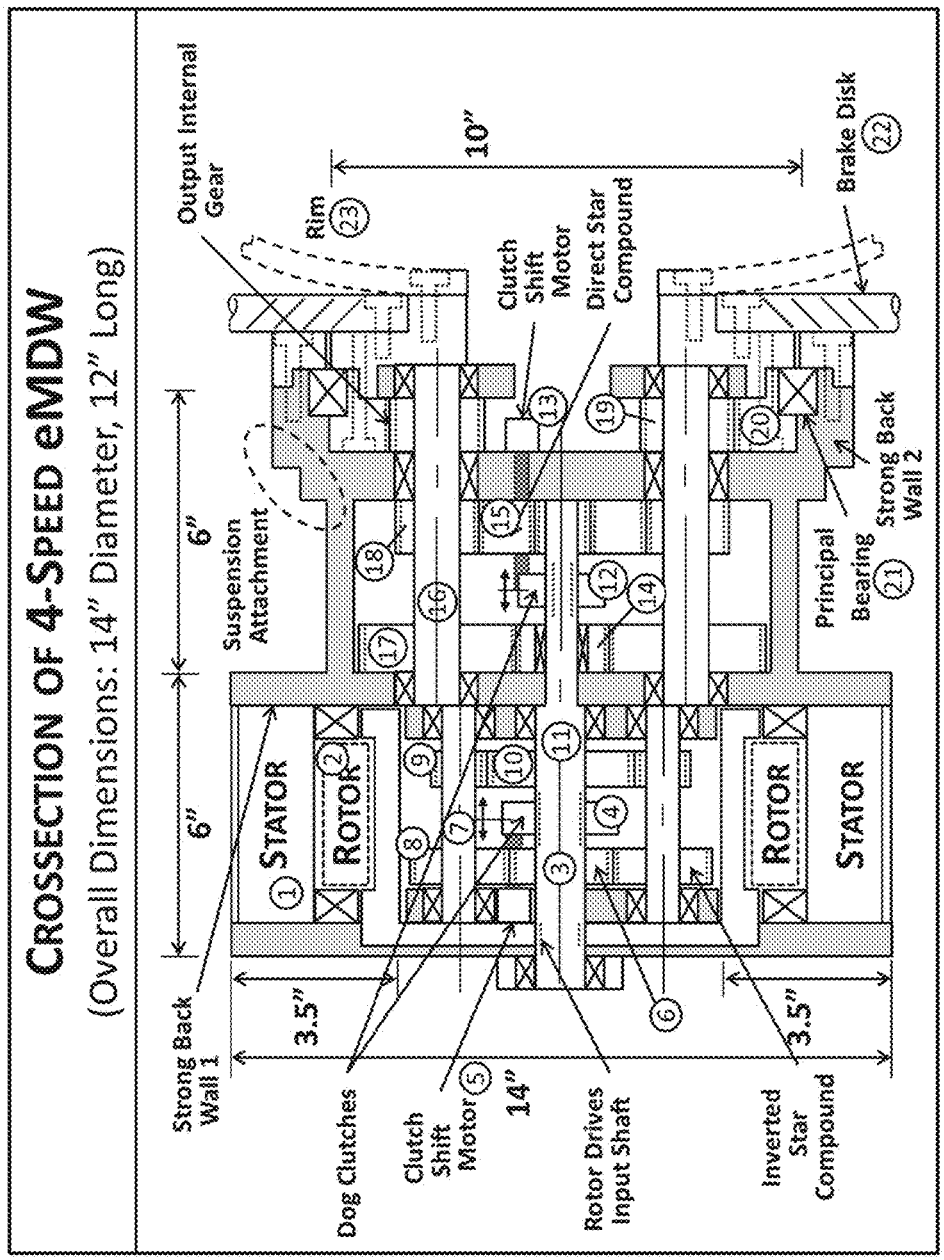
FIG. 1 is a cross-sectional illustration of a first particular, non-limiting embodiment of a 4-speed eMDW in accordance with the teachings herein.

FIG. 1 represents the cross-section of a particular, non-limiting embodiment of an eMDW in accordance with the teachings herein. On the far left is the prime mover, which is preferably a high-end BLDC for best combination of torque density and efficiency. The stator (1) dominates the prime mover in a rigid shell. This shell is preferably ribbed aluminum to permit best cooling in the air flow just outside the wheel rim. The rotor (2) is supported by adjacent bearings to reduce the effects of shock on the thin air gap between rotor and stator.

The rotor is suspended by a disk on the left which drives the pinion shaft (3) of the front-end clutched star compound gear reducer. The pinion shaft (3) drives the dog leg clutch (4), which is shifted by motor (5) either to engage floating gear (6) or gear (10). If gear (6) is engaged, it drives star gears (8 and 9) on the same rigid shaft (7). Three or more star gears are concentrically arrayed around pinion (3) to produce no radial forces on the pinion (3). The shaft (7) of each star gear is supported by two bearings (at each end of the shaft in rigid stationary support disks). This array of star gears (9) drive gear (10) splined to the output shaft (11) for the front-end star compound. Alternatively, the clutch can now engage gear (10) directly to then drive shaft (11). Generally, it is expected that this shift ratio is 2-to-1.

Shaft (11) now drives the second dog leg clutch (12) driven by motor (13) (with a spline on the shaft) to engage either floating gear (14) or (15). Note that shaft (16) rigidly connects star gears (17) and (18). Engaging (14) drives star gear (17) which, then, drives star gear (19) on shaft (16) to drive the output internal gear (20) which is the output of the backend star compound. The reduction ratio may be 3-to-1. Engaging floating gear (15) drives the second star gear (18) with a reduction ratio (say) of 1.15. In this case, the shift ratio would be 2.61 for the backend star compound. Star gear (18) on shaft (16) now drives star gear (19), which drives the final output internal gear (20).

The output internal gear (20) is supported by principal bearing (21) to form the shortest force path to the actuator frame. The brake (22) and wheel rim (23) are rigidly attached to internal gear (20). All of these principal items are also shown in the 3-D layout of this 4-speed eMDW.

All of the 23 parts are listed in TABLE 1 except for the bearings that support all the gear shafts. The important principal bearing (20) is singled out in TABLE 1. There are a total of 23 principal parts in 4 basic modules:

1. Prime mover (BLDC);
2. Front-end Star Compound Gear Train Reducer;
3. Back-end Star Compound Gear Train Reducer; and
4. Wheel Interface where Star Gears drive output internal gear which holds brake disk and wheel rim.

All shafts are preferably supported by simple ball bearings that are lightly loaded. All gears may be helical to reduce noise. Both clutches may be driven by simple on/off motors with switching times of 10 m-sec. Note that the front-end star compound is small enough to fit inside the rotor of the prime mover. Its small scale means that it runs at high speed, low forces/torques and modest inertia content. The back-end star compound is roughly twice as large in scale as the front-end star compound. The back-end star compound runs at low speeds to store lower kinetic energy, but carries heavier torques and forces. Finally, the last plane of gears is unusually rugged to carry very heavy forces/torques. It is preferably able to resist all shocks, which validates the use of the large diameter grooved roller bearing.

TABLE 1

Four-Speed eMDW Parts List

| Part No. | Qty. | Description |
|---|---|---|
| 1 | 1 | Stator is a wound set of laminates to generate magnetic field to drive the rotor. |
| 2 | 1 | Rotor is a rotating cylinder usually with rare earth magnets to drive the front-end star compound pinion. |
| 3 | 1 | Front-end star compound input pinion shaft, splined to the shift clutch. |
| 4 | 1 | Front-end star compound dog leg clutch to engage either floating gear 6 or 10. |
| 5 | 1 | Front clutch motor, very simple on/off motor which drives a screw to horizontally move the clutch yoke. |
| 6 | 1 | The floating gear on pinion shaft 3. This is a high-speed gear which requires good design and manufacture (probably helical). |
| 7 | 3 | This is the shaft that rigidly joints gears 8 and 9 to make the amplifier star gear for the front-end star compound. The minimum is 3, but 4 or more is feasible depending on the geometry. This shaft is supported by bearings at each end in a pair of rigid disks attached to the shell. |
| 8 | 3 | Front-end star compound star gear rigidly attached to star gear 9. |
| 9 | 3 | Second star gear on front-end star compound. This gear drives gear 10 attached to output shaft 11. |
| 10 | 1 | Output gear of the front-end star compound rigidly attached to output shaft 11. |
| 11 | 1 | Output shaft of the front-end star compound which is concentric with input shaft 3 with a joint bearing for mutual support. |
| 12 | 1 | The dog leg clutch of the back-end star compound gear train. It is shifted by motor 13. |
| 13 | 1 | Clutch motor to drive clutch 12. This is a simple on/off motor to drive the screw to move the clutch yoke horizontally. |
| 14 | 1 | This is a floating gear that is engaged by the clutch to drive one side of the backend star compound gear train. |
| 15 | 1 | This is a second floating gear that is engaged by the clutch to drive the second side of the back-end star compound. |
| 16 | 3 | Shaft to rigidly attach star gears 17 & 18 together to form star amplifier gears for the backend star compound. Each shaft is supported at both ends by bearings held by rigid strong back walls. Each shaft also rigidly drives output star gears 19. |
| 17 | 3 | First star gear driven by engaged floating gear 14 to then drive shaft 16 which then drives output star gear 19. The reduction ratio may be 2.0-to-1. |
| 18 | 3 | Second star gear driven by engaged floating gear 15 which, then, drives shaft 16 to drive output star 19. The reduction ratio might be 4-to-1 to give a shift ratio of 2. |
| 19 | 3 | Backend star compound output star gear rigidly attached to shaft 16. This star gear drives the final internal output gear 20. The reduction ratio might be 6-to-1. |
| 20 | 1 | The final output (internal) gear rigidly supported by principal bearing 21. This gear must be very stiff and rigid, of large diameter. |
| 21 | 1 | This principal large diameter, small Cross-section bearing is either a cross-roller or a grooved roller bearing (GRB). The GRB is preferred. It forms a very stiff/rugged shortest force path between the suspension and the wheel. |
| 22 | 1 | Likely brake disk rigidly attached to the frame of the internal output gear 20. |
| 23 | 1 | Wheel rim rigidly bolted with a precision mounting rim to the frame of the internal output gear. |

Figure 2:
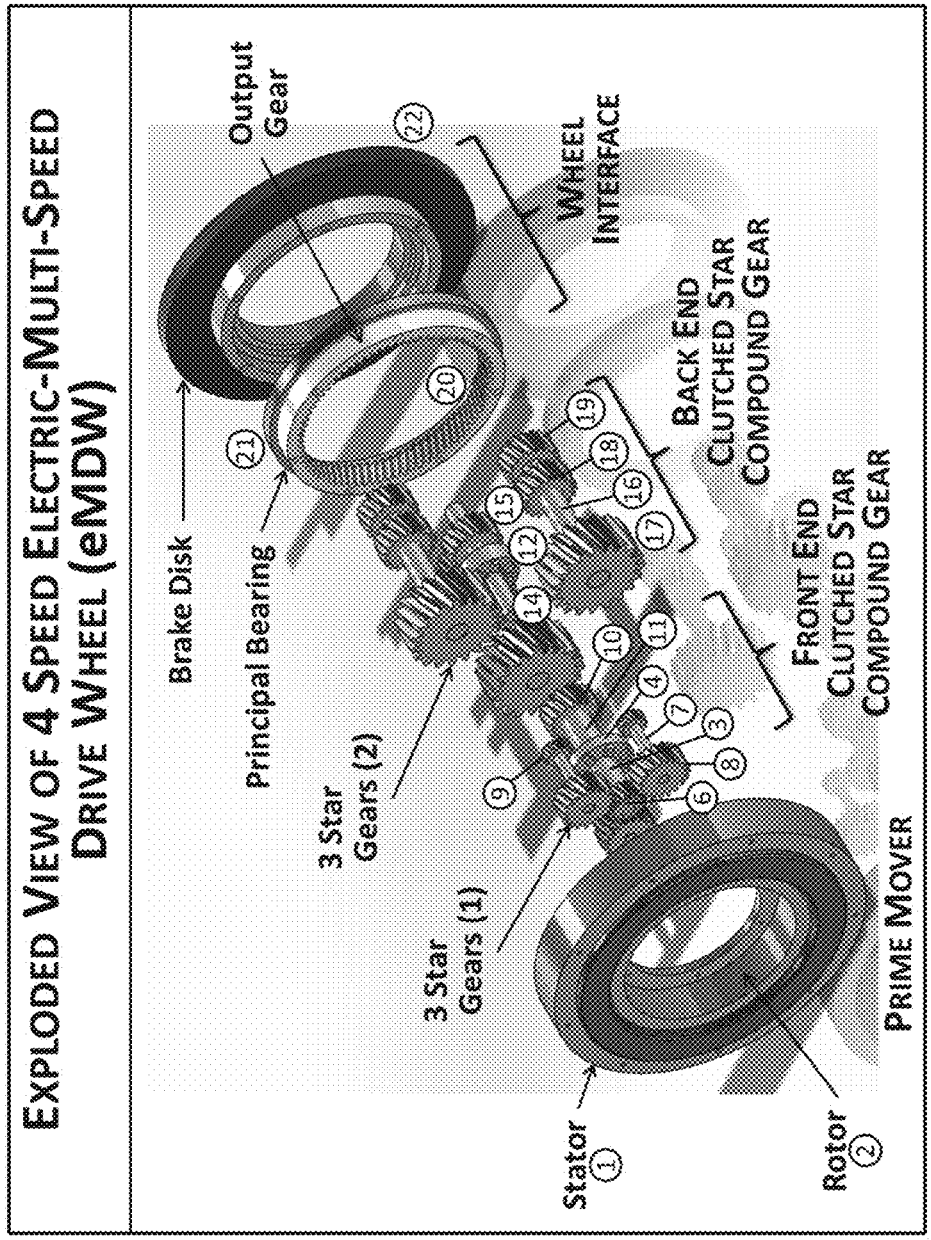
FIG. 2 is an exploded view of the 4-speed eMDW of FIG. 1.

The cross-section in FIG. 1 shows the left to right (motor to wheel) layers of the technology as an engineer would consider it. The exploded view in FIG. 2 does the same in 3-D with some less detail (i.e., without any of the small bearings). Note that the front-end star compound fits inside the rotor of the motor. The rotor drives the input pinion of the front-end clutched star compound. The clutch shift ratio is approximately 2-to-1. The output shaft of the front-end star compound drives the input pinion of the clutched back-end star compound which has a shift ratio of ~3-to-1. The last set of star gears drive the internal output gear attached directly to the brake and wheel. The large diameter principal bearing supports the back-end star compound and provides rotation reference for the wheel. The wheel suspension structure of the vehicle attaches to the strong back wall between the back-end star compound and the wheel to form a very strong/rigid and shortest force path to maximize rigidity with minimum weight.

Preferably, all of the gears are equipped with standard helical gear teeth. The clutches are preferably on/off motor driven dog legs that can be switched in 5 to 10 m-sec. Preferably, all of the bearings are small diameter, lightly loaded ball bearings in fixed backbone structures; the exception is the principal bearing, which is preferably a grooved roller bearing. This bearing provides exceptional ruggedness between the suspension and the wheel.

Note that the disk brake is open (as usual) to the air for cooling. It is not expected that anything needs to be done to reconfigure the wheel. The 100 h.p. continuous power version disclosed herein is expected to weigh 200 lb., not counting the wheel and tire. This is an exceptionally light wheel drive, and would be useful for transit buses and fleet vehicles. Construction and farming machinery (such as, for example, loaders, scrapers, and farm row crop chemical sprayers) may also benefit from this layout. The eMDWs disclosed herein impart various benefits to the vehicles and systems which utilize them. These benefits include, but are not limited to, the benefits set forth in TABLE 2 below. Each of these benefits is discussed in greater detail below.

TABLE 2

Benefits of eMDWs

| | Benefit |
|---|---|
| 1 | Economic Impact |
| 2 | Customer Choice |
| 3 | Reduced Drive Line Complexity |
| 4 | Rapid Vehicle Redesign |
| 5 | Computer Reference Model |
| 6 | Traction Management |
| 7 | Performance Map Based eMDW Operation |
| 8 | eMDW Configurations |
| 9 | Reconfigurable Power Controller (RPC) |
| 10 | Remaining Useful Life (RUL) |
| 11 | Hybrid Electric Vehicles |
| 12 | Single Point Failures |
| 13 | Maneuverability |
| 14 | Responsiveness |
| 15 | Managed Duty Cycles |

Economic Impact

U.S. land transport is currently a $1 trillion/year business, and includes cars, trucks, buses, trains and fleet vehicles. In all cases, a modern driveline technology would reduce life cycle cost and reduce fuel consumption. Further, emissions would be reduced, especially in inner cities.

Customer Choice

The computer/social media revolution has shown that customers want expanded choices at lower cost. For vehicles, this means standardization of highly-certified components that can be rapidly repaired or upgraded (plug-and-play) and mass produced in minimum sets to minimize cost while enhancing performance (see FIGS. 5-6). This leads to open architecture, which enables an expanded competitive supply chain to emerge, thus further driving up the performance/cost ratio.

Reduced Drive Line Complexity

Almost all vehicles use a singular internal combustion engine, a complex transmission (clutches and flywheel), a driveline of several universal joints in a central shaft, differential, split drives for front and rear axles, perpendicular wheel axles, and wheels with brakes. This complexity dominates vehicle architecture, represents major design constraints, ensures the existence of a few large manufacturers, and results in a continuously increasing life cycle cost with minimal choices (perhaps cosmetic) left to the customer (see FIGS. 7-8).

Rapid Vehicle Redesign

During the 1930's, many cars were designed with separate bodies and chassis. Today, the chassis dramatically constrains body design. For example, a modular chassis with eMDWs would permit free battery mass distribution, lower the mass center of gravity for more stability, remove the driveline hump, eliminate expensive transmissions and differentials, and permit low weight but stiff body structures. Doing so would permit rapid/revolutionary vehicle design to accelerate integration of emerging technologies, while also reducing cost by mass production in minimum sets.

Computer Reference Model

Early computers were massive centralized systems of high repetitive complexity where electronic switching tubes required constant surveillance to prevent failure. During the 1970's, the tech base was energized by computer chips and became easier to maintain (higher durability), but the systems remained centralized with poor customer accessibility and specialized maintenance. Essentially, current land transport systems are locked in this old paradigm. In the 1980's, however, DELL, Inc. combined with Microsoft and Intel to create open architecture personal computers, enabling component choices by the customer. This dramatically improved performance/cost ratios, created a competitive supply chain to accelerate technical integration, and provided mass production of highly-certified components in minimum sets. This now must be done for vehicles with a cost reduction of 2× and a fuel reduction of 2× for automobiles and similar goals for other land transport systems.

Traction Management

Vehicle control depends on managed friction forces at the tire/surface contact. Considering all potential forces (wheel spin, sideways sliding, bounce, etc.), and effects of road surface condition (ice, moisture, snow, temperature, tire wear, etc.), all tires should be represented by a finite number of embedded performance maps to calculate actual force levels based on real time (less than 1 m-sec.) sensor data generation. To obtain rapid response to this map-based command means that the prime mover must be rigidly connected to the wheel. By contrast, a cross-country truck with its heavy/deformable driveline has a decision latency of 1 sec., or 100 ft. at 70 mph. Getting this latency down to 10 m-sec. (i.e., 1 ft.) requires direct drive, as represented by the eMDW.

Performance Map Based eMDW Operation

All intelligent systems (tires, gear trains, controllers, power supplies, and the like) are highly non-linear. For example, each eMDW component will preferably have a non-planar map of its efficiency relative to wheel torque/speed parameters. Some prime mover maps have sweet spots of high efficiency of 90% for about 30% of the space, but drop down to 50% in 20-30% of the space. Hence, it is essential to combine these component maps into efficiency envelopes to always maximize efficiency. This may be done by choosing the most suitable gear ratio for the existing torque and speed, or choosing 3 wheels to drive, or 2 or even just 1. The one-wheel choice in slow traffic may reduce fuel consumption by 4× in this class of duty cycle. Similar envelopes for acceleration, hill climbing, downhill energy recovery, and the like now become possible because of the versatility of the eMDW-based vehicle disclosed herein.

eMDW Configurations

For automobiles, the range of choices typically goes from 16 to 40 h.p. in the 2-speed configuration to give the customer a very useful minimum set of power choices (16, 20, 24, 30, & 40) at very low cost (see FIG. 6). It is estimated that the cost of the modular car will be reduced by 2× while improving its efficiency by 2×. This represents a significant improvement in the art (see FIGS. 9-12).

For trains, the same eMDW can drive an axle on each railroad car to move robotically in a switchyard. This requires little or no human support, and thus avoids the risk of injury normally associated with such maneuvers. Moreover, this approach may provide nearly perfect train make-ups in precise timelines.

The adoption of the 4-speed eMDWs disclosed herein provides significant design flexibility in that it allows the number of in-wheel drives to be optimized for a given end use. Thus, for example, it enables the use of 2 eMDWs on fleet vehicles, 4 eMDWs on buses, 4 eMDWs on earth moving trucks, 2 eMDWs on the rear wheels of earth scrapers, 4 eMDWs on all wheels of material loaders, and 4 eMDWs on all wheels of farm row crop sprayers. It will thus be appreciated that eMDWs provide the basis for a revolution in land transport systems.

Reconfigurable Power Controller (RPC)

Given major choices for parameters such as speed, torque, gear ratios, acceleration and efficiency, the power controller may also embed similar choices (for example, efficiency, voltage, current and temperature management). This means that multiple subsystem components and circuits may need to be available in milliseconds to best match the demands on the eMDW. These controllers may be made up of high-end/low-cost components in sub modules that may be configured on demand. The combination of the RPC and the eMDW may be utilized to maximize choices at each wheel (perhaps 12 choices and 80 configurations). These choices not only help respond to performance commands, but also provide a means for configuring around faults so as to reduce single point failures.

Remaining Useful Life

More choices in a vehicle system implies more basic components that might degrade or fail as compared to the previous direct mechanical drivelines (sensors, controllers, prime movers, bearings, gearing, and the like). Given original performance maps for each component, updated maps resulting from use may be differenced to:
1. predict when performance will be reduced below an acceptable level.
2. predict when significant physical failure will occur.

These predictions may substantially reduce life cycle cost, eliminate unexpected failures, improve availability (almost no downtime), enable automated scheduling of repairs and provide useful repair cost estimates. The process is usually labeled CBM (Condition-Based Maintenance) by military logistics programs.

Hybrid Electric Vehicles

Most HEVs will generate power to go directly to the eMDWs or to battery packs for later use. The necessary I.C. engine (typically a light diesel) will be tuned to run at maximum efficiency and drive a 50 to 100 h.p. generator that may also be tuned for maximum efficiency. The combination means that if high peak acceleration is necessary, it may be achieved by the eMDWs that are preferably adapted to generate high peak power for at least short periods of time. All of these components (such as, for example, engine, battery, generator, controllers and eMDWs) preferably utilize standard interfaces to enable rapid quick-change out (plug-and-play) to minimize downtime and to maximize availability. This works to enable minimum sets of components to be mass produced in large quantities at increasingly lower costs and with increasing better performance (i.e., the mechanical equivalent of Moore's law for electronics, computers, and social media).

Eliminate Single Point Failures

The eMDW-based vehicle open architectures disclosed herein may tolerate numerous failures while maintaining a reasonable level of performance. Given 4 speeds and 5 choices, 4 power controller choices, and 4 voltage choices, each eMDW represents 80 choices. Given 4 wheels, this becomes 320 choices, all of which may be used to continue operation under somewhat reduced performance. This continued operation improves availability, reduces repair costs, and reduces the need for distributed large caches of spares for organizational vehicle fleets.

Maneuverability

One benefit of individual wheel control is dramatically improved maneuverability, especially in tight turns and poor weather. Classic concern for passive under/over steer may be eliminated in favor of real time (5 m-sec.) torque response at each wheel in the systems disclosed herein. For example, in a turn, the front outer wheel has more contact force, while the rear inner wheel has less contact force. Managing the torques on all four wheels depending, for example, on their real (measured) contact force, will always ensure proper commanded steering (unless sudden contact friction changes occur in bad weather). Fundamentally, this is called torque vectoring. The many choices in the eMDW may make this remarkably effective. Similarly, pitch control when accelerating or braking may rapidly account for contact force changes (front and rear tires). Finally, for off-road cases in rough terrain, it may become necessary to combine active suspensions with the active eMDWs. Because the low weight of eMDWs (from 40 to 70 lb.) for cars, this is typically not necessary in automotive applications.

Responsiveness

In heavy traffic, poor weather, rough terrain, or when acceleration is desired, it is preferred that the eMDW respond rapidly to command. This typically requires high prime mover peak torque and low rotational inertia in the eMDW gear reducer. Also, it is very desirable to shift eMDW reduction ratios smoothly and sequentially in the 5 to 10 millisecond regime to best distribute speed change torque crossovers (shocks). The eMDW is superior in this regard to the normal cumbersome mechanical driveline still used in most vehicles (which has a shift latency of 0.3 to 1 sec.).

Managed Duty Cycles

One significant benefit of eMDW-based vehicles is their potential to manage best performance to match a given route duty cycle (see FIG. 13). In inner cities, the vehicle may run only on batteries with no emissions and no noise, and may make efficient use of power plant generated energy. This is especially useful in start-stop traffic. Fleet vehicles experience repetitive stops/accelerations, hill climbing, and the like. The Eaton Corporation showed in 2002 that a simple HEV would reduce fuel consumption by 50%. Here, it is forecasted that the reduction will be 2×. Also, drivability for long drives may improve (acceleration, traction control, and efficiency management). Finally, for repetitive duty cycles (say, bus routes), the performance data may be archived for off-line analysis by predictive analytics to improve decision criteria (stop times, zero idling, energy recovery, acceleration, fuel consumption, fatigue minimization, and the like), and to also establish design refinements (especially, the eMDW and its controller) for improved life cycle costs.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. It will also be appreciated that the various features set forth in the claims may be presented in various combinations and sub-combinations in future claims without departing from the scope of the invention. In particular, the present disclosure expressly contemplates any such combination or sub-combination that is not known to the prior art, as if such combinations or sub-combinations were expressly written out.

What is claimed is:

1. A rotary actuator, comprising:
   a prime mover including a rotor and a stator;
   a front-end star compound gear which is driven by said prime mover and which is equipped with a first pinion shaft, a first plurality of star gears arrayed concentrically around said first pinion shaft, a first clutch, a first clutch shift motor, an output shaft, and first, second and third gears, wherein said third gear is attached to said output shaft;
   a back-end star compound gear which is driven by said output shaft;
   a wheel interface which is driven by said back-end star compound gear and which includes a principal bearing and a brake disk;
   wherein said first pinion shaft drives said first clutch;
   wherein said first clutch shift motor shifts said first clutch between a first position in which said first clutch engages said first gear, and a second position in which said first clutch engages said third gear;
   wherein, when said first clutch engages said first gear, said first gear drives said first plurality of star gears.

2. The rotary actuator of claim 1 wherein, when said first clutch engages said first gear, said first plurality of star gears drive said third gear.

3. The rotary actuator of claim 1, wherein said rotor is suspended by a disk, and wherein said disk drives said first pinion shaft.

4. The rotary actuator of claim 1, wherein each of said first plurality of star gears is equipped with a shaft supported by a plurality of bearings.

5. The rotary actuator of claim 4, wherein said plurality of bearings includes a first set of bearings disposed in a first rigid support disk, and a second set of bearings disposed in a second rigid support disk.

6. The rotary actuator of claim 5, wherein said first set of bearings is disposed on a first end of said shaft, and wherein said second set of bearings is disposed on a second end of said shaft.

7. The rotary actuator of claim 1, wherein the shift ratio of the first clutch is about 2-to-1.

8. The rotary actuator of claim 1, wherein the first clutch is a dog-leg clutch.

9. The rotary actuator of claim 1, wherein said prime mover is disposed within a rigid shell.

10. The rotary actuator of claim 9, wherein said rigid shell comprises ribbed aluminum.

11. The rotary actuator of claim 1, wherein said rotor is supported by a set of support bearings.

12. The rotary actuator of claim 1, wherein said backend star compound gear includes a second clutch equipped with a second clutch shift motor.

13. The rotary actuator of claim 12, wherein said output shaft drives said second clutch.

14. The rotary actuator of claim 13, wherein said backend star compound gear includes fourth, fifth and sixth gears.

15. The rotary actuator of claim 14, wherein said second clutch shift motor shifts said second clutch between a first position in which said second clutch engages said fourth gear, and a second position in which said first clutch engages said fifth gear.

16. The rotary actuator of claim 15, further comprising a second plurality of star gears, and wherein, when said second clutch engages said fourth gear, said clutch drives a first of said second plurality of star gears.

17. The rotary actuator of claim 16, further comprising:
   a shaft having first and second star gears of said second plurality of star gears disposed thereon; and
   an output internal gear;
   wherein said first of said second plurality of star gears drives said second of said second plurality of star gears, and wherein said second of said second plurality of star gears drives said output internal gear.

18. The rotary actuator of claim 17, wherein said output internal gear is the output of said back-end star compound gear.

19. The rotary actuator of claim 18, wherein the shift ratio of the second clutch is about 3-to-1.

20. The rotary actuator of claim 16 wherein, when said second clutch is in said second position, said fifth gear drives said second of said second plurality of star gears.

21. The rotary actuator of claim 20, wherein said second plurality of star gears drives a third of said second plurality of star gears, and wherein said third of said second plurality of star gears drives said output internal gear.

22. The rotary actuator of claim 21, wherein said output internal gear is supported by said principal bearing.

23. The rotary actuator of claim 22, further comprising an actuator frame, and wherein the shortest force path to the actuator frame extends through said output internal gear and said principal bearing.

24. A wheel rim in combination with the rotary actuator of claim 21, wherein said brake disk and said wheel rim are rigidly attached to said output internal gear.

* * * * *